United States Patent
Kondo (10) Patent No.: US 10,088,900 B2
(45) Date of Patent: Oct. 2, 2018

(54) INFORMATION PROCESSING METHOD AND INFORMATION PROCESSING SYSTEM

(71) Applicant: COLOPL, INC., Tokyo (JP)

(72) Inventor: Ippei Kondo, Tokyo (JP)

(73) Assignee: COLOPL, INC., Tokyo (JP)

(*) Notice: Subject to any disclaimer, the term of this patent is extended or adjusted under 35 U.S.C. 154(b) by 0 days.

(21) Appl. No.: 15/372,378

(22) Filed: Dec. 7, 2016

(65) Prior Publication Data

US 2017/0185148 A1    Jun. 29, 2017

(30) Foreign Application Priority Data

Dec. 28, 2015  (JP) ................. 2015-256033

(51) Int. Cl.
| | |
|---|---|
| *G06F 3/01* | (2006.01) |
| *G06F 3/16* | (2006.01) |
| *G06T 11/60* | (2006.01) |
| *G02B 27/01* | (2006.01) |

(52) U.S. Cl.
CPC .............. *G06F 3/013* (2013.01); *G06F 3/012* (2013.01); *G06F 3/165* (2013.01); *G06T 11/60* (2013.01); *G02B 2027/0178* (2013.01)

(58) Field of Classification Search
CPC .............. G02B 27/017; G02B 27/0172; G02B 27/0176; G02B 27/0093; G02B 2027/0132–2027/0136; G02B 2027/0174; G02B 2027/0178; G02B 23/0125; G06F 3/012; G06F 3/013; H04N 13/0429–13/044; H04N 5/7491
See application file for complete search history.

(56) References Cited

U.S. PATENT DOCUMENTS

| | | | |
|---|---|---|---|
| 7,027,600 B1 | 4/2006 | Kaji et al. | |
| 2014/0225812 A1* | 8/2014 | Hosoya | G02B 27/017 345/8 |
| 2014/0285404 A1* | 9/2014 | Takano | G06F 3/005 345/8 |
| 2015/0055808 A1* | 2/2015 | Vennstrom; Anders | G06F 3/167 381/307 |

(Continued)

FOREIGN PATENT DOCUMENTS

| | | |
|---|---|---|
| JP | 2000-267675 A | 9/2000 |
| JP | 2003-203250 A | 7/2003 |

(Continued)

OTHER PUBLICATIONS

Decision to Grant a Patent in JP Patent Application No. 2015-256033, dated Aug. 30, 2016.

*Primary Examiner* — Priyank Shah
(74) *Attorney, Agent, or Firm* — Hauptman Ham, LLP (57) ABSTRACT

To enable a state of an object to be changed based on a relationship between a line of sight of a user wearing a head-mounted display and a position of the object arranged in a virtual space, a specific object is arranged at a predetermined position in the virtual space. A determination is made whether the specific object is located outside a certain range from the line of sight of the user wearing the head-mounted display for a first predetermined period. Then, when the specific object is located outside the certain range from the line of sight of the user for the first predetermined period, a sound associated with the specific object is generated.

13 Claims, 6 Drawing Sheets

(56) References Cited

U.S. PATENT DOCUMENTS

| | | |
|---|---|---|
| 2015/0352437 A1 | 12/2015 | Koseki et al. |
| 2016/0025981 A1* | 1/2016 | Burns ................ G02B 27/0093 |
| | | 345/156 |
| 2016/0035351 A1* | 2/2016 | Sendai ................ G02B 27/017 |
| | | 704/275 |
| 2016/0133051 A1* | 5/2016 | Aonuma ............... G06T 19/006 |
| | | 345/633 |
| 2016/0179336 A1* | 6/2016 | Ambrus ............... G02B 27/017 |
| | | 715/768 |
| 2016/0196098 A1* | 7/2016 | Roth ....................... B60Q 9/00 |
| | | 715/761 |
| 2016/0210736 A1* | 7/2016 | Aruga ................ G02B 27/0172 |
| 2016/0240009 A1* | 8/2016 | Lyren ....................... H04R 1/00 |
| 2017/0061692 A1* | 3/2017 | Giraldi ................. G06T 19/006 |

FOREIGN PATENT DOCUMENTS

| | | | |
|---|---|---|---|
| JP | 2015-231443 A | 12/2015 | |
| JP | 2015-232783 A | 12/2015 | |

* cited by examiner

OBJECT INFORMATION 211

| OBJECT IDENTIFIER | OBJECT POSITION | FIRST PREDETERMINED PERIOD | SOUND | FIRST GRAPHICS | SECOND GRAPHICS |
|---|---|---|---|---|---|
| SPECIFIC OBJECT | (xs1,ys1,zs1) | 10 SECONDS | SOUND 1a (e.g., "BAM") | GRAPHICS 1a (e.g., "PORTRAIT OF YOUNG WOMAN" IS HUNG NORMALLY ON WALL) | GRAPHICS 1a' (e.g., "PORTRAIT OF OLD WOMAN" IS HUNG CROOKEDLY ON WALL) |
| | | | SOUND 1b (e.g., "CRASH") | GRAPHICS 1b (e.g., "PORTRAIT OF YOUNG WOMAN" IS HUNG NORMALLY ON WALL) | GRAPHICS 1b' (e.g., FALLEN "PORTRAIT OF OLD WOMAN" IS BROKEN INTO PIECES) |
| NON-SPECIFIC OBJECT | (x1,y1,z1) | --- | --- | --- | --- |

FIG. 6

INFORMATION PROCESSING METHOD AND INFORMATION PROCESSING SYSTEM

RELATED APPLICATIONS

The present application claims priority to Japanese Patent Application Number 2015-256033 filed Dec. 28, 2015, the disclosure of which is hereby incorporated by reference herein in its entirety.

BACKGROUND

This description relates to an information processing method and an information processing system.

In Japanese Patent Application Laid-open No. 2000-267675, there is disclosed a technology of performing, at a predetermined listening position, audio simulation to sounds produced from a predetermined sounding position in a three-dimensional virtual space.

The technology of Japanese Patent Application Laid-open No. 2000-267675 takes into account the relationship between a position of a sound source arranged in the three-dimensional virtual space and a distance with respect to the listening position to perform sound processing of an object. Therefore, in the technology of Japanese Patent Application Laid-open No. 2000-267675, the audio simulation cannot be formed for an invisible object that is located outside a certain range from a line of sight of a user wearing a head-mounted display on his/her head.

SUMMARY

This description has been made in view of the above-mentioned point, and helps to change a position of an object in a three-dimensional virtual reality space and a state of an object located outside a certain range from a line of sight of a user wearing a head-mounted display (hereinafter referred to as "HMD"), to thereby notify the user of the presence of the object.

In order to help solve the above-mentioned problem, according to at least one embodiment of this description, there is provided a method of providing a virtual reality space to which a user is immersed with use of a head-mounted display. The method includes defining the virtual reality space in which a specific object is arranged at a predetermined position. The method further includes specifying a reference line of sight of the user wearing the head-mounted display and specifying, from the virtual reality space, a field-of-view region to be visually recognized by the user. The method further includes determining whether the specific object is located outside a certain range from a line of sight of the user wearing the head-mounted display for a first predetermined period. The method further includes generating a sound associated with the specific object in response to a determination that the specific object is outside the certain range for the first predetermined period.

Further, according to at least one embodiment of this description, there is provided a method of providing a virtual reality space to which a user is immersed with use of a head-mounted display. The method includes defining the virtual reality space in which a specific object is arranged at a predetermined position. The method further includes specifying a reference line of sight of the user wearing the head-mounted display and specifying, from the virtual reality space, a field-of-view region to be visually recognized by the user. The method further includes determining whether the specific object is located within a certain range from a line of sight of the user wearing the head-mounted display. In response to a determination that the specific object is within the certain range, the method includes generating a field-of-view image in which the specific object is drawn by first graphics. The method further includes determining whether the specific object is thereafter located outside the certain range from the line of sight of the user for a first predetermined period. The method further includes generating a field-of-view image in which the specific object is drawn by second graphics in response to a determination that the specific object is located outside the certain range for the first predetermined period.

According to this description, changing the position of the object in the three-dimensional virtual reality space and the state of the object located outside the certain range from the line of sight of the user is possible.

DETAILED DESCRIPTION

First, contents of embodiments of this technology are described. An information processing method and an information processing system according to at least one embodiment of this description have the following configuration.

(Item 1) A method of providing a virtual reality space to which a user is immersed with use of a head-mounted display. The method includes defining the virtual reality space in which a specific object is arranged at a predetermined position. The method further includes specifying a reference line of sight of the user wearing the head-mounted display and specifying, from the virtual reality space, a field-of-view region to be visually recognized by the user. The method further includes determining whether the specific object is located outside a certain range from a line of sight of the user wearing the head-mounted display for a first predetermined period. The method further includes generating a sound associated with the specific object in response to a determination that the specific object is outside the certain range for the first predetermined period.

(Item 2) A method of providing a virtual reality space to which a user is immersed with use of a head-mounted display. The method includes defining the virtual reality space in which a specific object is arranged at a predetermined position. The method further includes specifying a reference line of sight of the user wearing the head-mounted display and specifying, from the virtual reality space, a field-of-view region to be visually recognized by the user. The method further includes determining whether the specific object is located within a certain range from a line of sight of the user wearing the head-mounted display. The method further includes, in response to a determination that the specific object is outside the certain range for the first predetermined period, generating a field-of-view image in which the specific object is drawn by first graphics. The method further includes determining whether the specific object is thereafter located outside the certain range from the line of sight of the user for a first predetermined period. The method further includes, in response to a determination that the specific object is located outside the certain range for the first predetermined period, generating a field-of-view image in which the specific object is drawn by second graphics when the secondly determining is positive.

(Item 3) A method according to Item 2, further including generating a sound associated with the specific object when the secondly determining is positive.

(Item 4) A method according to Item 1 or 3, in which the sound associated with the specific object is generated based on a position of the specific object in the virtual reality space.

(Item 5) A method according to Item 1 or 2, in which the certain range from the line of sight of the user is defined as the field-of-view region at a maximum.

(Item 6) A system including a processor and a non-transitory computer readable medium for storing instructions. The processor is configured to execute the stored instructions for implementing the method of any one of Items 1 to 5.

Now, a at least one embodiment of this description is described in detail with reference to the accompanying drawings. This description is not limited to those examples, and is defined by the scope of claims. All modifications within the scope of claims and the equivalents thereof are covered by this description. In the following description, like elements are denoted by like reference symbols in the description of the drawings, and redundant description thereof is omitted.

Figure 1:
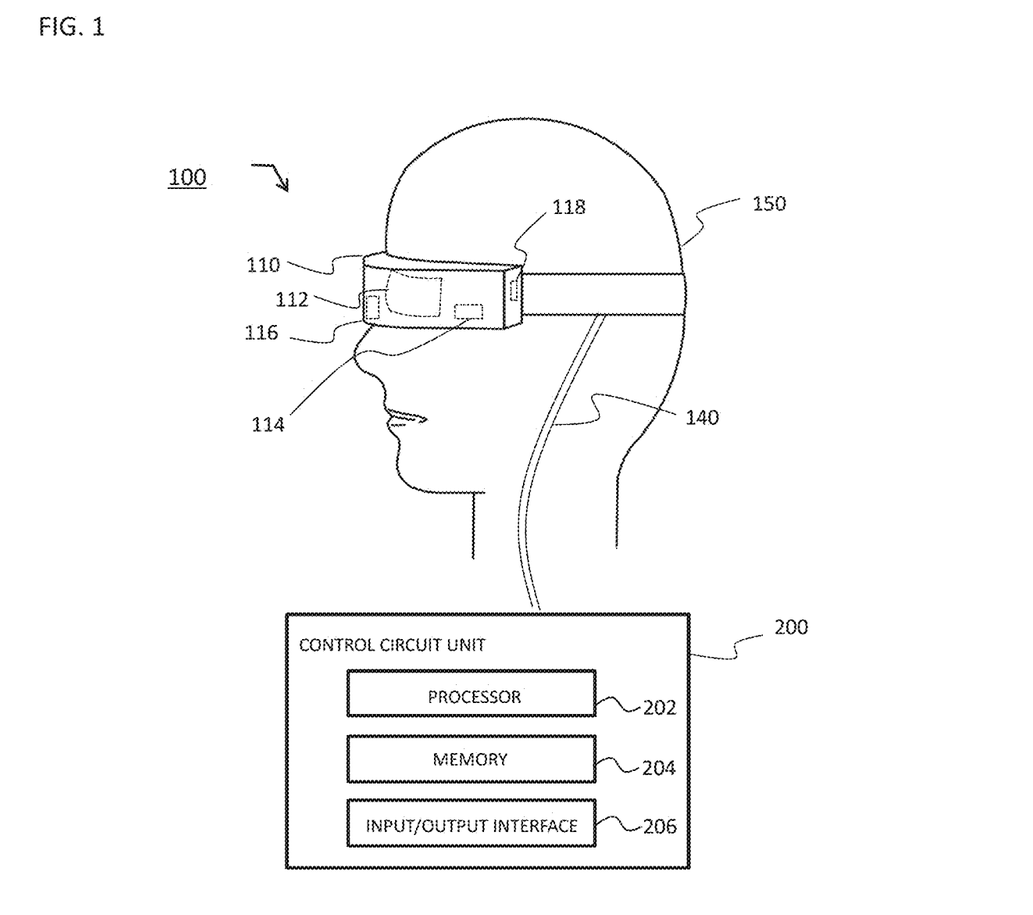
FIG. 1 is a view of an HMD system according to at least one embodiment of this technology.

FIG. 1 is a hardware configuration view of an HMD system 100 according to at least one embodiment of this technology. The HMD system 100 includes an HMD 110 and a control circuit unit 200. The HMD 110 and the control circuit unit 200 are, as an example, electrically connected to each other by a cable 140 so as to enable mutual communication. Instead of the cable 140, wireless connection may be used.

Now, the HMD 110 and the control circuit unit 200, which are components constructing the HMD system 100, are described in detail with reference to FIG. 1 and FIG. 2.

The HMD 110 is a display device to be used by being worn on a head of a user 150. The HMD 110 includes a display 112, a sensor 114, an eye tracking device (hereinafter referred to as "ETD") 116, and speakers (headphones) 118. In at least one embodiment, at least one of the ETD 116 or the sensor 114 is omitted.

The display 112 is configured to present an image in a field of view of the user 150 wearing the HMD 110. For example, the display 112 may be configured as a non-transmissive display. In at least one embodiment, the sight of the outside world of the HMD 110 is blocked from the field of view of the user 150, and the user 150 can see only the image displayed on the display 112. On the display 112, for example, an image generated with use of computer graphics is displayed. As an example of the image generated with use of computer graphics, there is given a virtual space image obtained by forming an image of a virtual space (for example, a world created in a computer game).

The display 112 may include a right-eye sub-display configured to provide a right-eye image, and a left-eye sub-display configured to provide a left-eye image. In this case, two two-dimensional images for the right eye and the left eye are superimposed on the display 112, and thus a three-dimensional virtual space image is provided to the user 150. Further, as long as the right-eye image and the left-eye image can be provided, the display 112 may be constructed of one display device. For example, a shutter configured to enable recognition of a display image with only one eye may be switched at high speed, to thereby independently provide the right-eye image and the left-eye image.

The ETD 116 is configured to track the movement of the eyeballs of the user 150, to thereby detect the direction of the line of sight of the user 150. For example, the ETD 116 includes an infrared light source and an infrared camera. The infrared light source is configured to irradiate the eye of the user 150 wearing the HMD 110 with infrared rays. The infrared camera is configured to take an image of the eye of the user 150 irradiated with the infrared rays. The infrared rays are reflected on the surface of the eye of the user 150, but the reflectance of the infrared rays differs between the pupil and a part other than the pupil. In the image of the eye of the user 150 taken by the infrared camera, the difference in reflectance of the infrared rays appears as the contrast of the image. Based on this contrast, the pupil is identified in the image of the eye of the user 150, and further the direction of the line of sight of the user 150 is detected based on the position of the identified pupil.

The sensor 114 is a sensor configured to detect the inclination and/or the position of the HMD 110 worn on the head of the user 150. Examples of the sensor 114 include a magnetic sensor, an angular velocity sensor, an acceleration sensor, or a combination thereof. When the sensor 114 is a magnetic sensor, an angular velocity sensor, or an acceleration sensor, the sensor 114 is built into the HMD 110, and is configured to output a value (magnetic, angular velocity, or acceleration value) based on the inclination or the position of the HMD 110. By processing the value output from the sensor 114 by an appropriate method, the inclination and the position of the HMD 110 worn on the head of the user 150 are calculated. The inclination and the position of the HMD 110 can be used to change a display image of the display 112 so as to follow the movement of the head of the user 150 when the head is moved. For example, when the user 150 turns his/her head to the right (or left, upward, or downward), the display 112 may display a virtual sight in the right (or left, upward, or downward) of the user in the virtual reality space. With this, the user 150 can experience a higher sense of immersion to the virtual reality space.

As the sensor 114, a sensor provided outside of the HMD 110 may be employed. For example, the sensor 114 may be an infrared sensor separated from the HMD 110 and installed at a fixed position in a room. An infrared emitting member or an infrared reflecting marker formed on the surface of the HMD 110 is detected with use of the infrared sensor. Such a type of sensor 114 is sometimes called a position tracking sensor.

The speakers (headphones) 118 are respectively provided near the right and left ears of the user 150 wearing the HMD 110. The speakers 118 are configured to convert electrical sound signals generated by the control circuit unit 200 into physical vibrations, to thereby provide sounds to the right and left ears of the user. A time difference and a volume difference may be set to the sounds output from the right and left speakers so that the user 150 can sense the direction and the distance of a sound source arranged in the virtual space.

The control circuit unit 200 is a computer to be connected to the HMD 110. The control circuit unit 200 may be mounted on the HMD 110, or may be constructed of separate hardware. In at least one embodiment control circuit unit 200 includes a personal computer or server computer connected to HMD 110 via a network. Further, a part of the functions of the control circuit unit 200 may be mounted on the HMD 110, and other functions may be mounted on separate hardware. As illustrated in FIG. 1, the control circuit unit 200 includes a processor 202, a memory 204, and an input/output interface 206. The control circuit unit 200 may further include a communication interface (not shown).

The processor 202 is configured to read out a program stored in the memory 204, to thereby execute processing in accordance with the program. When the processor 202 executes an information processing program stored in the memory 204, various functions of the control circuit unit 200 to be described later are achieved. The processor 202 includes a central processing unit (CPU) and a graphics processing unit (GPU).

The memory 204 has stored therein at least an operating system and the information processing program. The operating system is a computer program for controlling the entire operation of the control circuit unit 200. The information processing program is a computer program for achieving respective functions of the control circuit unit 200 to be described later. The memory 204 can further temporarily (in a non-transitory manner) or permanently store data generated by the operation of the control circuit unit 200. Specific examples of the memory 204 include a read only memory (ROM), a random access memory (RAM), a hard disk, a flash memory, and an optical disc.

The user input interface 206 is configured to receive inputs for operating the image generating device 200 from the user 150 of the HMD system 100. Specific examples of the user input interface 206 include a game controller, a touch pad, a mouse, and a keyboard.

The communication interface (not shown) includes various wire connection terminals for communicating to/from an external device via a network, or various processing circuits for wireless connection. The communication interface is configured to adapt to various communication standards or protocols for communication via a local area network (LAN) or the Internet.

Figure 2:
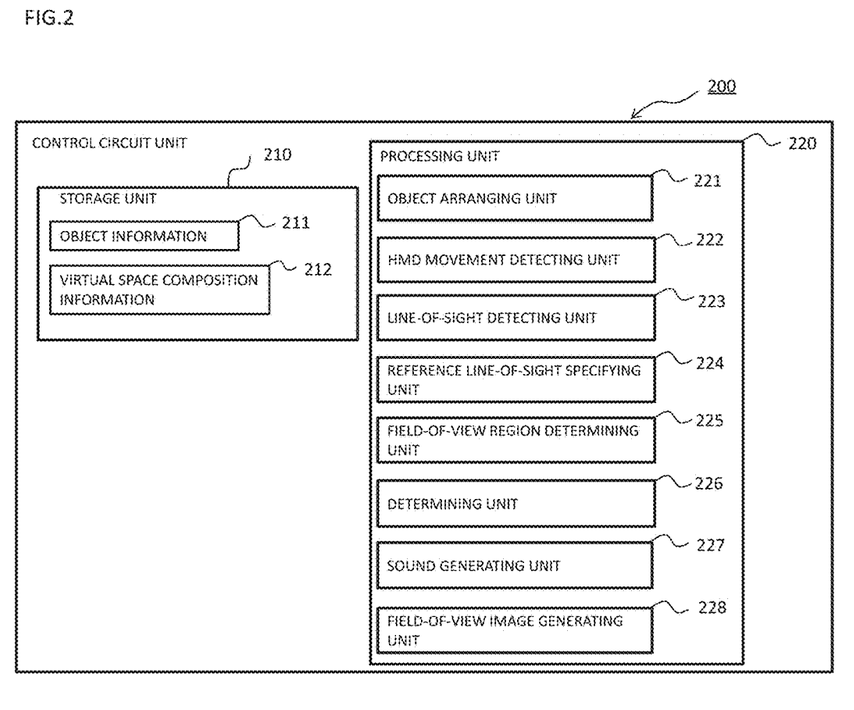
FIG. 2 is a block diagram of a function of a control circuit unit, for achieving a function of the HMD system according to at least one embodiment.

FIG. 2 is a block diagram of a functional configuration of the control circuit unit 200 according to at least one embodiment of this technology. The control circuit unit 200 includes a storage unit 210 and a processing unit 220. The storage unit 210 further includes object information 211 and virtual space composition information 212. In at least one embodiment, the storage unit 210 corresponds to the memory 204 illustrated in FIG. 1. In at least one embodiment, the processing unit 220 includes an object arranging unit 221, an HMD movement detecting unit 222, a line-of-sight detecting unit 223, a reference line-of-sight specifying unit 224, a field-of-view region determining unit 225, a determining unit 226, a sound generating unit 227, and a field-of-view image generating unit 228. In at least one embodiment, the processing unit 220 and the respective units 221 to 228 included in the processing unit 220 are achieved by the processor 202 illustrated in FIG. 1 reading out a program stored in the memory 204 and executing the program.

Figure 3:
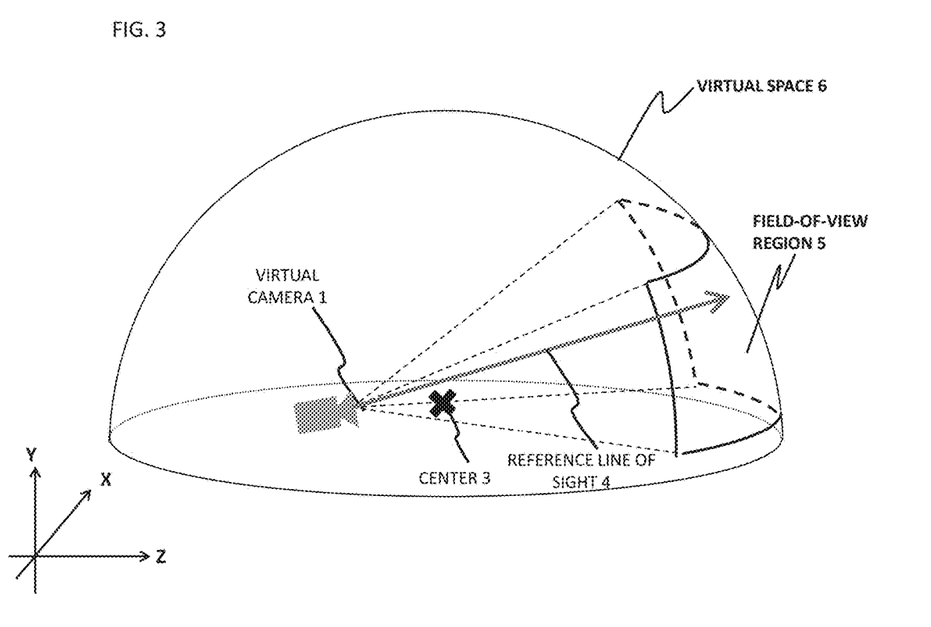
FIG. 3 is an XYZ space diagram of an example of a virtual space according to at least one embodiment.

FIG. 3 is an XYZ space diagram of an example of a virtual space according to at least one embodiment. An XZ plane represents the ground surface, and a Y axis extends in a height direction. A virtual space 6 is formed into, for example, a celestial sphere shape with a center 3 being a center. In the virtual space 6, a virtual camera 1 and a plurality of computer-controllable objects (not shown) are arranged. The virtual camera 1 is arranged in the virtual space 6. The virtual camera 1 may be arranged at the center 3 or offset from the center 3. The movement of the virtual camera 1 changes so as to follow the movement of the head of the user 150 or the movement of the line of sight of the user 150.

In at least one embodiment, a sound associated with a specific object arranged in the virtual space 6 is generated based on the relationship between the object arranged in the virtual space 6 and the line of sight of the user 150. For example, in a horror game, a virtual space of a dark room in which a plurality of objects (for example, pieces of furniture) are arranged is displayed on the display 112 of the user 150 wearing the head-mounted display. When a specific object (for example, a portrait) arranged in the virtual space is located outside a certain range from the line of sight of the user 150 for a predetermined time period, a sound associated with the specific object is generated and output.

Figure 4:
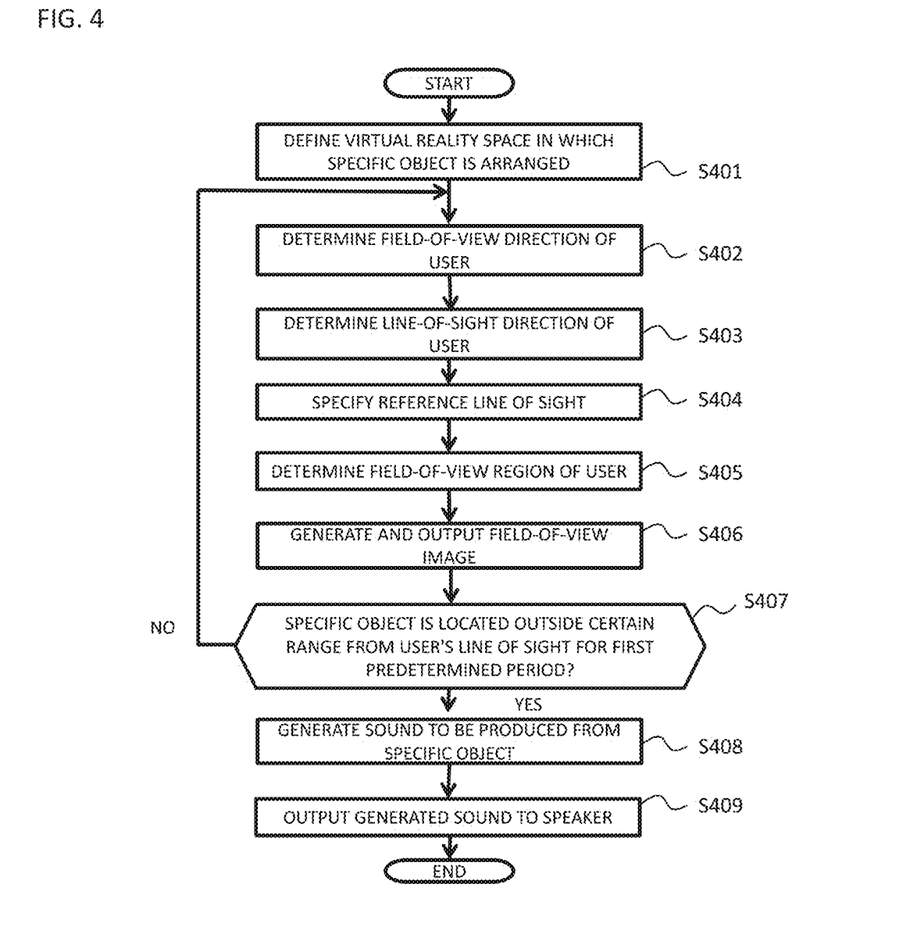
FIG. 4 is a flow chart of an operation example of a control circuit unit according to at least one embodiment.

FIG. 4 is a flow chart of an operation example of the control circuit unit according to at least one embodiment of this technology. In at least one embodiment, the operation example of the control circuit unit 200 is described with reference to FIG. 4.

First, in Step S401, the object arranging unit 221 illustrated in FIG. 2 refers to the object information 211 stored in the storage unit 210 to define the virtual reality space (virtual space 6) in which a specific object is arranged. The objects can include a specific object and a non-specific object. The specific object refers to an object that changes (generates a sound in at least one embodiment) based on the relationship with the line of sight of the user 150 (or a field-of-view region 5). The non-specific object refers to an object that does not change based on the relationship with the line of sight of the user 150 (or the field-of-view region 5). A predetermined position of the object arranged in the virtual space may be a fixed position in the virtual space or may be a position controlled to move. Further, one or a plurality of objects (specific objects or non-specific objects) may be arranged in the virtual space 6.

In Step S402, the HMD movement detecting unit 222 determines a field-of-view direction of the user 150. The HMD movement detecting unit 222 acquires over time the value (magnetic, angular velocity, or acceleration value) based on the inclination or the position of the HMD 110, which is detected by the sensor 114, and processes the value by an appropriate method, to thereby acquire the inclination and/or the position of the HMD 110. Then, the HMD movement detecting unit 222 determines the field-of-view direction of the user 150 based on the acquired inclination and/or position of the HMD 110.

In Step S403, the line-of-sight detecting unit 223 determines a line-of-sight direction of the user based on the gazing direction (s) of the right eye and/or the left eye of the user, which is/are detected by the ETD 116. Specifically, the line-of-sight detecting unit 223 specifies a point of gaze being an intersection of the gazing directions of the right eye and the left eye of the user based on the gazing directions of the right eye and the left eye of the user, which are detected by the ETD 116. Then, the line-of-sight detecting unit 223 determines the line-of-sight direction of both eyes of the user based on the point of gaze. The line-of-sight direction of both eyes of the user is defined as, for example, an extension direction of a straight line, which passes through the point of gaze and a midpoint of the user's right and left eyes.

In Step S404, the reference line-of-sight specifying unit 224 specifies the reference line of sight 4 based on the field-of-view direction of the user 150 specified based on the position and the inclination of the HMD 110, and/or the line-of-sight direction of the user 150. For example, a straight line connecting between the midpoint of the right and left eyes of the user 150 and the middle of the display 112 positioned in the field-of-view direction is specified as the reference line of sight 4. Further, for example, the line-of-sight direction of the user specified by the eye gaze sensor 140 is specified as the reference line of sight 4.

In Step S405, the field-of-view region determining unit 225 determines the field-of-view region 5 of the virtual camera 1 in the virtual space 6 based on the reference line of sight 4. The field-of-view region 5 is set to, for example, as illustrated in FIG. 3, a range including a predetermined polar angle and a range including a predetermined azimuth with the reference line of sight 4 being the center.

In Step S406, the field-of-view image generating unit 228 refers to the virtual space composition information 212 stored in the storage unit 210 to generate a field-of-view image corresponding to the field-of-view region 5. The virtual space composition information 212 stores a three-dimensional real space image of the virtual space 6. When there is an object (specific object or non-specific object) in the field-of-view region 5, the field-of-view image generating unit 228 generates a field-of-view image in which the object is arranged in the virtual space 6.

Further, in Step S406, the HMD 110 receives the information relating to the field-of-view image from the control circuit unit 200, and outputs the field-of-view image to the display 112 to cause the display 112 to display the field-of-view image.

Then, in Step S407, the determining unit 226 determines whether the specific object is located outside a certain range from the line of sight of the user 150 wearing the head-mounted display for a first predetermined period. The first predetermined period is a period provided for the user not recognizing the presence of the specific object to recognize the presence of the specific object. The first predetermined period associated with the specific object is set in advance, and is, for example, 10 seconds. The line of sight of the user 150 is determined based on the line-of-sight direction of the user, which is detected by the ETD 116. Further, the line of sight of the user 150 may be determined based on the inclination and/or the position of the HMD 110. In this case, for example, the line of sight of the user is determined based on a straight line connecting between the midpoint of the right and left eyes of the user 150 and the middle of the display 112 positioned in the field-of-view direction. Further, the certain range from the line of sight of the user 150 is defined to be the field-of-view region 5 at the maximum, and may be narrower than the field-of-view region 5.

Figure 5:
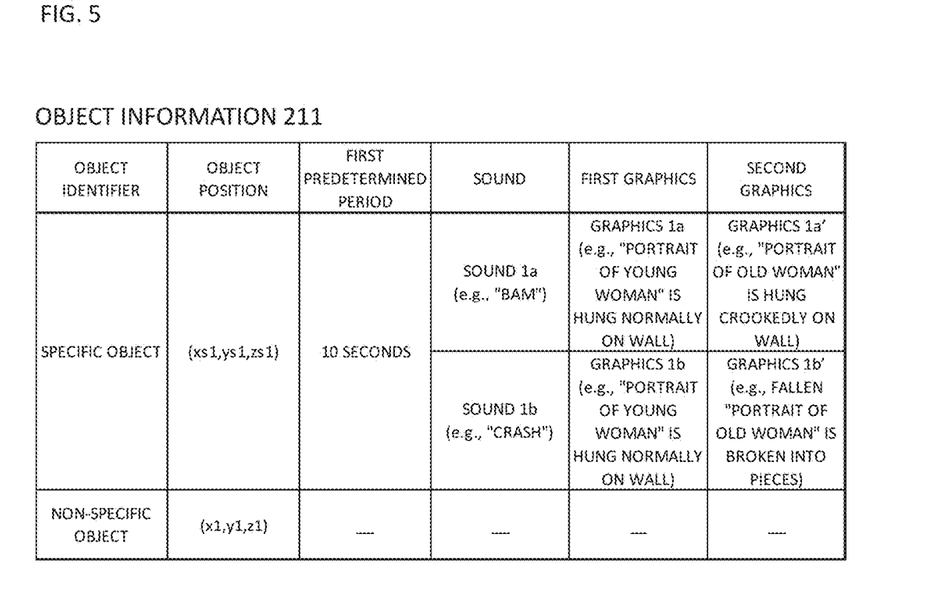
FIG. 5 is a table for showing at least one example of an object information composition.

FIG. 5 is a table for showing an example of the composition of the object information 211 stored in the storage unit 210. For example, as shown in FIG. 5, the objects include a specific object and a non-specific object. Each of the specific object and the non-specific object has position coordinates set in, for example, an orthogonal coordinate system. Further, the specific object has the "first predetermined period", and a "sound", "first graphics", and "second graphics" to be described later set therefor, but those parameters are not set for the non-specific object. As described above, a plurality of specific objects may be provided, and in this case, different first predetermined periods may be set for the respective specific objects. For example, a short first predetermined period is set for a specific object having high importance (for example, a treasure box), and a long first predetermined period is set for a specific object having low importance (for example, an ornament). This is for enabling the user to recognize the presence of the specific object having high importance earlier.

In Step S407, in the case of "YES", that is, when the specific object is located outside the certain range from the line of sight of the user 150 wearing the head-mounted display for the first predetermined period, the sound generating unit 227 generates a sound associated with the specific object being a sound producing object (Step S408). First, the sound generating unit 227 refers to the object information 211 shown in FIG. 5 to determine a sound corresponding to the specific object, which is defined in advance. Then, the sound generating unit 227 appropriately processes the sound defined for each object based on a predetermined position of the object in the virtual space, to thereby generate sound signals for the right and left speakers. When the object is controlled to move, the sound generating unit 227 further obtains positions of the moving object in the virtual space at certain intervals to generate sound signals for the right and left speakers based on each of the positions of the object. When there are a plurality of specific objects, the sound generating unit 227 may select one specific object to generate a sound associated with the one selected specific object. This is because the sound may be output from the speakers at an excessive volume when the sounds produced from the 5 plurality of objects are simultaneously played.

In Step S409, the HMD 110 receives the information relating to the generated sound signals for the right and left speakers from the control circuit unit 200, and outputs the sound signals to the right and left speakers 118, respectively. With the sounds output from the right and left speakers 118, the user can hear as if the specific object is present at a predetermined position in the virtual space.

On the other hand, in Step S407, in the case of "NO", that is, when the specific object is not located outside the certain range from the line of sight of the user 150 wearing the head-mounted display for the first predetermined period, the processing from Step S402 to Step S407 is repeated.

In at least one embodiment, when the specific object is located outside the certain range from the line of sight of the user 150 for the first predetermined period, a sound associated with the specific object is generated, and the speaker outputs the sound. With the sound, the attention of the user 150 can be directed to the specific object. The sound production from the specific object is particularly effective when the specific object is moving. The user 150 may hear the sound output from the speaker to identify the direction and/or the position in the virtual space of the specific object being a sound source. The user 150 may move his/her head or line of sight toward the direction and/or the position of the specific object being the sound source so that the specific object being the sound source falls within the field-of-view region 5. When the object is located in the field-of-view region 5, the field-of-view image generating unit 228 may draw graphics corresponding to the object to output the graphics to the display 112.

Further, in at least one embodiment, a sound is output from a place that is not visually recognized by the user 150 for a predetermined period. Such a sound effect can give a feeling of fear to the user immersed to the virtual space, and the amusement of particularly a horror game can be improved.

Figure 6:
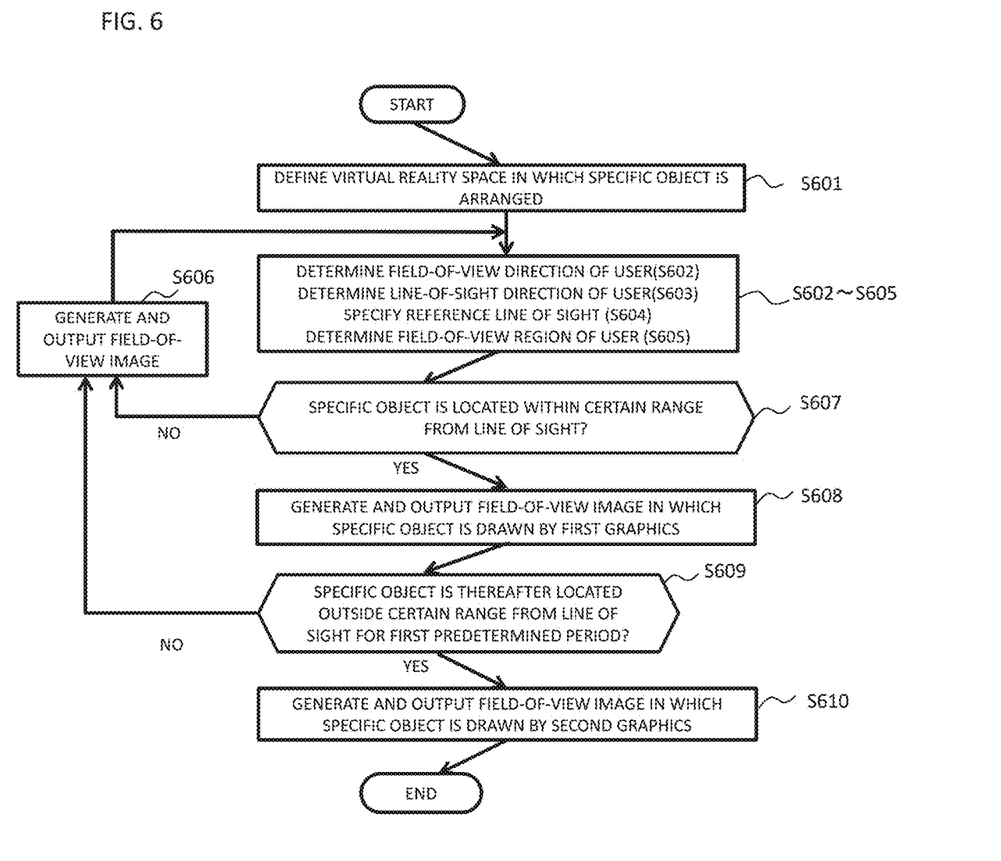
FIG. 6 is a flow chart of an operation example of the control circuit unit according to at least one embodiment.

FIG. 6 is a flow chart of an operation example of the control circuit unit according to at least one embodiment. The at least one embodiment of FIG. 6 differs from the at least one embodiment of FIG. 4 in that graphics of the object are changed instead of the sound based on the relationship between the specific object arranged in the virtual space and the line of sight of the user (or the field-of-view region). In at least one embodiment, first, the object located within a certain range from the line of sight of the user 150 is drawn by first graphics. After that, when the specific object is located outside the certain range from the line of sight of the user 150 for a predetermined period, the specific object is drawn by second graphics different from the first graphics. That is, while the specific object is visually recognized by the user 150, the graphics of the specific object are not changed. Once the user turns his/her eyes away from the specific object, the graphics of the object are changed. In the following, description of the at least one embodiment of FIG. 6 for parts similar to the configuration of the at least one embodiment of FIG. 4 is omitted or simplified.

The processing from Step S601 to Step S605 illustrated in FIG. 6 is similar to the processing from Step S401 to Step S405 in FIG. 4.

In Step S607, the determining unit 226 illustrated in FIG. 2 determines whether the specific object is located within the certain range from the line of sight of the user 150 (first determination). In Step S607, in the case of "YES", that is, when the specific object is located within the certain range from the line of sight of the user, the processing proceeds to Step S608.

In Step S608, the field-of-view image generating unit 228 refers to the object information 211 to specify the first graphics corresponding to the specific object. Further, the field-of-view image generating unit 228 refers to the virtual space composition information 212 to generate the field-of-view image corresponding to the field-of-view region 5. Then, the field-of-view image generating unit 228 generates a field-of-view image in which the specific object drawn by the first graphics is superimposed on the field-of-view image corresponding to the field-of-view region 5. At this time, in at least one embodiment, whether the specific object is located within the certain range from the line of sight of the user 150 for a second predetermined period is determined. This helps to account for a delay in a user realizing the presence of the specific object located within the certain range from the line of sight. The second predetermined period is, for example, 3 seconds.

Further, in Step S608, the HMD 110 receives the information relating to the generated field-of-view image from the control circuit unit 200, and outputs the field-of-view image to the display 112 to cause the display 112 to display the field-of-view image.

On the other hand, in Step S607, in the case of "NO", that is, when the specific object is not located within the certain range from the line of sight of the user, the processing proceeds to Step S606.

In Step S606, the field-of-view image generating unit 228 refers to the virtual space composition information 212 to generate a field-of-view image corresponding to the field-of-view region 5. Further, in Step S606, the HMD 110 receives the information relating to the generated field-of-view image from the control circuit unit 200, and outputs the field-of-view image to the display 112 to cause the display 112 to display the field-of-view image. Then, the processing returns to Step S602.

In Step S609, the determining unit 226 determines whether the specific object is thereafter located outside the certain range from the line of sight of the user for the first predetermined period (second determination). In Step S609, in the case of "NO", that is, when the specific object is not located outside the certain range from the line of sight of the user for the first predetermined period, the processing proceeds to Step S606.

On the other hand, in Step S609, in the case of "YES", that is, when the specific object is located outside the certain range from the line of sight of the user for the first predetermined period, the processing proceeds to Step S610.

In Step S610, the field-of-view image generating unit 228 refers to the object information 211 to specify the second graphics corresponding to the specific object. The field-of-view image generating unit 228 refers to the virtual space composition information 212 to generate a field-of-view image corresponding to the field-of-view region 5. Then, the field-of-view image generating unit 228 generates a field-of-view image in which the specific object drawn by the second graphics different from the first graphics is superimposed on the field-of-view image corresponding to the field-of-view region 5.

Further, in Step S610, the HMD 110 receives the information relating to the field-of-view image from the control circuit unit 200, and outputs the field-of-view image to the display 112 to cause the display 112 to display the field-of-view image.

As described above, with the HMD system 100 according to at least one embodiment, different graphics (first graphics and second graphics) are provided for the specific object located within the certain range from the line of sight of the user and the specific object thereafter located outside the certain range from the line of sight of the user and then located within the certain range from the line of sight of the user again.

In at least one embodiment, when the specific object drawn by the first graphics (for example, a portrait of a young woman) is located outside the field-of-view region and is then visually recognized by the user again, the specific object is drawn by the second graphics (for example, a portrait of an old woman). Such a change in graphics can give a feeling of fear to the user immersed to the virtual space, and the amusement of particularly a horror game can be improved.

In some embodiments, the at least one embodiment of FIG. 4 and the at least one embodiment of FIG. 6 may be combined with each other. That is, the object may produce a sound and also undergo change in graphics based on the relationship between the object arranged in the virtual space and the line of sight of the user. Such embodiments are achievable by, for example, inserting Step S408 and Step S409 illustrated in FIG. 4 between Step S609 and Step S610 illustrated in FIG. 6.

In at least one embodiment, a plurality of sounds and a plurality of graphics may be associated with one specific object. For example, as shown in FIG. 5, the sound generating unit 227 selects, from the plurality of sounds (for example, sound 1a and sound 1b) corresponding to the specific object, the sound 1a (for example, "bam"), and generates a sound associated with the specific object based on the selected sound 1a. At this time, the field-of-view image generating unit 228 draws the specific object by the second graphics corresponding to the sound 1a (graphics 1a', for example, graphics in which a "portrait of an old woman" is hung crookedly on the wall). Further, for example, the sound generating unit 227 selects, from the plurality of sounds corresponding to the specific object, the sound 1b (for example, "crash"), and generates a sound associated with the specific object based on the selected sound 1b. At this time, the field-of-view image generating unit 228 draws the specific object by the second graphics corresponding to the sound 1b (graphics 1b', for example, graphics in which a fallen "portrait of an old woman" is broken into pieces). As described above, a plurality of sounds associated with one specific object may be provided, and graphics associated with each sound may be provided, to thereby provide a more complicated game space to the user. Further, the produced sound and the graphics are associated with each other, and hence a game space having a sense of presence is provided.

The embodiments of this description are described above. However, this description is not limited to the embodiments described above. A person skilled in the art would understand that various modifications may be made to the embodiments as long as the modifications do not deviate from the spirit and scope of this disclosure described in the claims described above.

For example, in the above-mentioned embodiments, the display 112 is a non-transmissive display, but a partially transmissive display may be employed. In this case, the user 150 can see the sight of the outside world of the HMD 110 with an image (object) displayed on the display 112 superimposed thereon.

What is claimed is:

1. A method of providing a virtual reality space to which a user is immersed with use of a head-mounted display, the method comprising:

defining the virtual reality space in which a specific object is arranged at a predetermined position, wherein a first object sound characterizes a first sound produced by a graphic of the specific object in the virtual reality space, and a second object sound characterizes a second sound produced by the graphic of the specific object in the virtual reality space;

specifying a reference line of sight of the user wearing the head-mounted display and specifying, from the virtual reality space, a field-of-view region visually recognizable by the user;

determining whether the specific object is located outside a certain range from the reference line of sight for a first predetermined period;

generating the first object sound or the second object sound in response to a determination that the specific object is outside the certain range for the first predetermined period; and drawing a second graphic of the specific object in the predetermined position, wherein the drawing of the second graphic, and the generating of the first object sound or the second object sound are executed in response to the specific object being outside field-of-view region for the first predetermined period.

2. The method according to claim 1, wherein the first object sound or the second object sound is a sound effect based, at least in part, on a position of the specific object in the virtual reality space.

3. The method according to claim 1, wherein the certain range from the line of sight of the user is defined as the field-of-view region at a maximum.

4. The method according to claim 1, wherein the first object sound or the second object sound is a sound effect cast from a position of the specific object in the virtual reality space at a time the specific object is outside the field-of-view region visually recognizable by the user.

5. The method according to claim 1, wherein the first object sound or the second object sound is based on an event in a context of the virtual reality space.

6. The method according to claim 1, wherein the first object sound or the second object sound is a sound effect based on a type of the specific object and an event in a context of the virtual reality space that causes a change in state of the specific object to occur.

7. A method of providing a virtual reality space to which a user is immersed with use of a head-mounted display, the method comprising:

defining the virtual reality space in which a specific object is arranged at a predetermined position;

specifying a reference line of sight of the user wearing the head-mounted display and specifying, from the virtual reality space, a field-of-view region visually recognizable by the user;

determining whether the specific object is located within the field of view;

in response to a determination that the specific object is located within the field of view, generating a field-of-view image in which the specific object is drawn by first graphics in the predetermined position;

determining whether the specific object is thereafter located outside the field of view for a first predetermined period; and generating a field-of-view image in which the specific object is drawn by second graphics in the predetermined position in response to a determination that the specific object is thereafter located outside the field of view for the first predetermined period, wherein the virtual reality space outside of the field of view is not visible to the user.

8. The method according to claim 7, further comprising generating a sound associated with the specific object in response to a determination that the specific object is thereafter located outside the field of view for the first predetermined period.

9. The method according to claim 8, wherein the sound associated with the specific object is generated based on a position of the specific object in the virtual reality space.

10. The method according to claim 7, wherein the field of view from the line of sight of the user is defined as the field-of-view region at a maximum.

11. A system for providing a virtual reality space to which a user is immersed with use of a head-mounted display, the system comprising:

a processor;

a non-transitory computer readable medium for storing instructions, wherein the processor is configured to execute the instructions for:

defining the virtual reality space in which a specific object is arranged at a predetermined position, wherein a first object sound characterizes a first sound produced by a graphic of the specific object in the virtual reality space, and a second object sound characterizes a second sound produced by the graphic of the specific object;

specifying a reference line of sight of the user wearing the head-mounted display and specifying, from the virtual reality space, a field-of-view region visually recognizable by the user;

determining whether the specific object is located outside a certain range from the reference line of sight for a first predetermined period;

generating the first object sound or the second object sound in response to a determination that the specific object is outside the certain range for the first predetermined period; and drawing a second graphic of the specific object in the predetermined position, wherein the drawing of the second graphic, and the generating of the first object sound or the second object sound are executed in response to the specific object being outside field-of-view region for the first predetermined period.

12. The system according to claim 11, wherein the first object sound or the second object sound is a sound effect based, at least in part, on a position of the specific object in the virtual reality space.

13. The system according to claim 11, wherein the certain range from the line of sight of the user is defined as the field-of-view region at a maximum.

* * * * *